United States Patent
You et al.

(10) Patent No.: US 9,003,431 B2
(45) Date of Patent: Apr. 7, 2015

(54) METHOD AND SYSTEM FOR IMPLEMENTING FUNCTION EXTENSION OF OPEN PLATFORM

(71) Applicant: Tencent Technology (Shenzhen) Company Limited, Shenzhen (CN)

(72) Inventors: Jing You, Shenzhen (CN); Yong Peng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/126,749

(22) PCT Filed: Nov. 23, 2012

(86) PCT No.: PCT/CN2012/085215
§ 371 (c)(1),
(2) Date: Dec. 16, 2013

(87) PCT Pub. No.: WO2013/097567
PCT Pub. Date: Jul. 4, 2013

(65) Prior Publication Data
US 2014/0317639 A1    Oct. 23, 2014

(30) Foreign Application Priority Data
Dec. 26, 2011    (CN) .......................... 2011 1 0441713

(51) Int. Cl.
*G06F 13/00*    (2006.01)
*G06F 9/445*    (2006.01)
*G06F 9/54*    (2006.01)

(52) U.S. Cl.
CPC ............ *G06F 9/44526* (2013.01); *G06F 9/542* (2013.01)

(58) Field of Classification Search
CPC ............................. G06F 9/45512; G06F 9/541
USPC .................................................. 719/320, 328
See application file for complete search history.

(56) References Cited

U.S. PATENT DOCUMENTS

| | | | |
|---|---|---|---|
| 6,671,800 B1 * | 12/2003 | McInally et al. | 713/1 |
| 2003/0149801 A1 * | 8/2003 | Kushnirskiy | 709/328 |
| 2008/0222617 A1 * | 9/2008 | Fernando et al. | 717/139 |
| 2013/0031339 A1 * | 1/2013 | Huang et al. | 713/1 |

FOREIGN PATENT DOCUMENTS

| | | |
|---|---|---|
| CN | 101276269 | 10/2008 |
| CN | 101303650 | 11/2008 |

* cited by examiner

*Primary Examiner* — Andy Ho
(74) *Attorney, Agent, or Firm* — Ladas & Parry LLP (57) ABSTRACT

Described are a method and a system for implementing function extension of an open platform. In the system, services that can be provided by an open platform are encapsulated and an operation interface is provided, so that plug-ins uniformly inherit the operation interface and transmit control parameters through the interface into a service entry to obtain the services. Therefore, the open platform has a simple framework and low coupling degree. Since the plug-ins are uniformly managed by a plug-in manager, the manageability and dynamic extensibility of the open platform are enhanced.

22 Claims, 4 Drawing Sheets

METHOD AND SYSTEM FOR IMPLEMENTING FUNCTION EXTENSION OF OPEN PLATFORM

CROSS-REFERENCE TO RELATED APPLICATIONS

This application represents a National Stage of PCT/CN2012/085215, filed on Nov. 23, 2012 which claims priority to Chinese Application No. 201110441713.8, filed on Dec. 26, 2011. The entire disclosure of each of the above applications is incorporated herein by reference.

BACKGROUND OF THE INVENTION

1. Field of the Invention

The present disclosure relates to the field of computers, and more particularly, to a method and a system for implementing function extension of an open platform.

2. Description of the Prior Art

The conventional development of a program is that an interface provided by an operating system is developed according to modularity. The method is function-oriented. The application program is divided into a plurality of functional modules. Each of the plurality of functional modules is developed. Modules with different functions are developed through interface functions provided by an operating system or a program design tool. Eventually, the modules with different functions are combined as an application program.

However, each of the modules is not uniformly managed by a framework in this kind of development of modularity. There is no clear development model as a reference for development of modularity. Due to the interface of the operating system called by the program, the interface of all program design tool, and the interface provided by coordinating companies, coupling among the modules get stronger and stronger. When the application program is fully developed, the fundamental functions of the application program are restricted. In other words, it is hard to revise the original functions or add new functions, which means that it is difficult to develop new functions. For example, it is very hard to add or customize additional functions after a large application program is completely developed and released because of the restriction of the initial framework of the application program.

The inventor finds out some problems occurring in the conventional technology in realizing the present disclosure:

The framework of the conventional technology makes programs, especially application programs, very hard to be managed and expanded. So it is difficult to satisfy various individual requirements of users and to expand functions.

SUMMARY OF THE INVENTION

In order to solve poor manageability and dynamic extensibility of the conventional development framework, the present disclosure proposes a method and a system for implementing function extension of an open platform.

According to the present disclosure, a method for implementing function extension of an open platform, includes:

defining a plug-in according to function requirements of a user, and enabling the plug-in to inherit an operation interface provided by a pre-established open platform so that the plug-in is used for transmitting a control parameter input by the user to a service entry provided by the open platform for obtaining a service provided by the open platform through the service entry;

registering the plug-in to a pre-established plug-in manager;

wherein the plug-in manager records information on locations of all registered plug-ins, and the plug-in manager enables the plug-in according to the information on a location which the plug-in corresponds to upon the condition that the plug-in manager is commanded to enable the plug-in;

before the step of defining a plug-in according to function requirements of a user, the method further includes:

defining the service provided by the open platform as a screen management, a title bar control, and a tray control, encapsulating the service provided by the open platform to form a corresponding category, and providing the service entry in public for the plug-in to obtain the service provided by the open platform through the service entry;

before the step of registering the plug-in to a pre-established plug-in manager, the method further includes:

defining the loading mechanism of the plug-in;

the loading mechanism of the plug-in including a local loading and a remote loading.

According to the present disclosure, a method for implementing function extension of an open platform, includes:

defining a plug-in for transmitting a control parameter input by a user to a service entry provided by the open platform;

registering the plug-in to a pre-established plug-in manager; wherein the plug-in manager records information on locations of all registered plug-ins, and the plug-in manager enables the plug-in according to the information on a location which the plug-in corresponds to upon the condition that the plug-in manager is commanded to enable the plug-in.

According to the present disclosure, a system for implementing function extension of an open platform, includes:

a service module, for encapsulating and saving services provided by the open platform to the plug-in, the services including screen management, title bar control, and tray control, alone or in combination;

an entry module, for providing an entry to the services encapsulated and saved by the service module to the plug-in so that the plug-in is used for transmitting the control parameter input by the user to the service entry;

a control interface module, for defining a plug-in for transmitting a control parameter input by a user to a service entry of the open platform; and a plug-in manager module, for registering the plug-in and recording information on locations of all registered plug-ins, and for enabling the plug-in according to the information on a location which the plug-in corresponds to when receiving a request of enabling the plug-in.

The present disclosure provides benefits as follows: A method for implementing function extension of the open platform is encapsulated through service provided by the open platform. The inherited interface used for unifying the plug-ins transmits the control parameter to the service entry through the interface to obtain the service. Thus, the framework of the open platform is simplified and the coupling degree of the open platform is lowered. Since the fundamentals of the open platform are ensured, the plug-in is managed uniformly by the plug-in manager. In this way, it becomes easier to manage and dynamically expand the open platform. Further, it gets simpler to add new functions to the open platform.

BRIEF DESCRIPTION OF THE DRAWINGS

These and other objectives of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENTS

For better understanding the object, the technical plan, the advantages of embodiments of the present disclosure, the following detailed description taken in conjunction with the accompanying drawings is provided.

Embodiment 1

Figure 1:
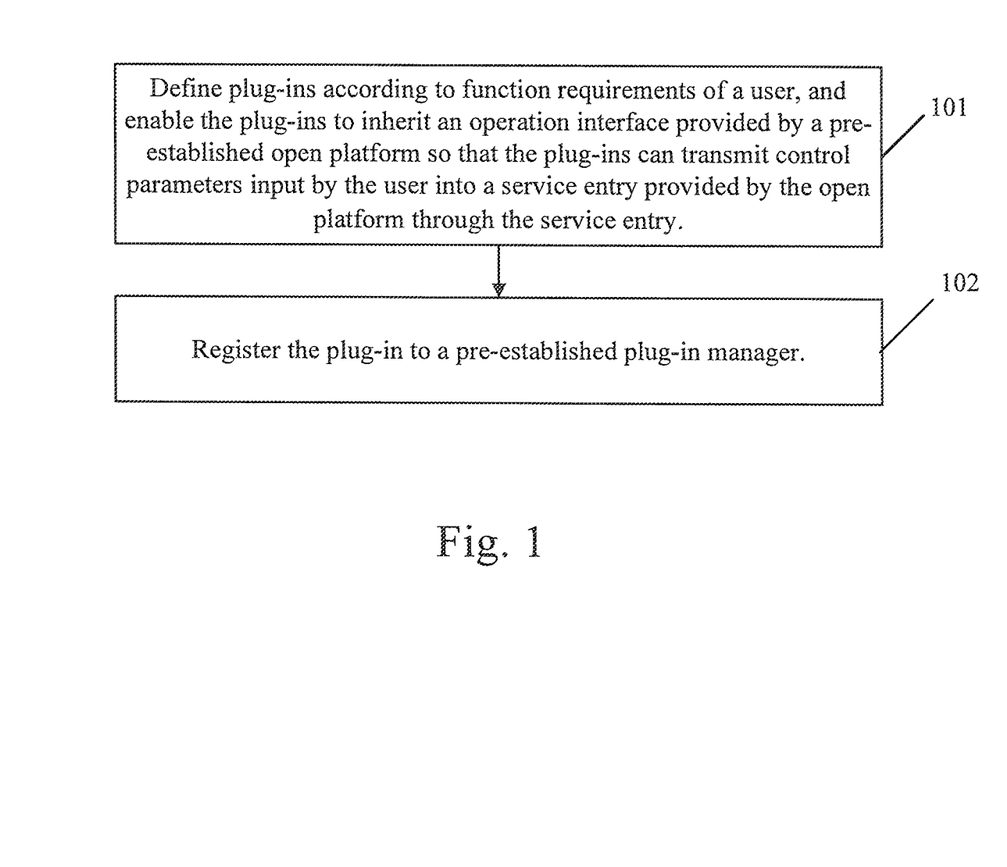
FIG. 1 is a flow chart of a method for implementing function extension of an open platform according to one embodiment of the present disclosure.

FIG. 1 shows a method for implementing function extension of an open platform according to a one embodiment of the present disclosure. The open platform is a software system which is based on open standards, such as published and fully documented external application programming interfaces (API) that allow using the software to function in other ways than the original programmer intended, without requiring modification of the source code. The method comprises following steps of:

Step 101: Define a plug-in for transmitting control parameters input by a user to a service entry of the open platform.

Specifically, for Step 101, define the plug-in according to function requirements of a user, and enable the plug-in inherit a pre-established operation interface provided by the open platform so that the plug-in can transmit the control parameter input by the user to the service entry provided by the open platform for obtaining service provided by the open platform through the service entry.

Step 102: Register the plug-in to a predetermined plug-in manager.

The plug-in manager records information on locations of all registered plug-ins. Upon the condition that the plug-in manager is commanded to enable the plug-in by the user, it enables the plug-in according to the location of the plug-in.

The embodiment further comprises following steps of:
providing an operation interface to the plug-in;
registering the plug-in and recording information on the location of the plug-in;
transmitting the control parameter to the input module when the plug-in receives the control parameter input by the user.

A method for implementing function extension of the open platform is that the service provided by the open platform is encapsulated and the operation interface is provided in the present embodiment. The inherited operation interface used for unifying the plug-in transmits the control parameter to the service entry through the interface to obtain the service. Thus, the framework of the open platform is simplified and the coupling of the open platform is lowered. Since the fundamentals of the open platform are ensured, the plug-in is managed uniformly by the plug-in manager. In this way, it becomes easier to manage and dynamically expand the open platform. Further, it gets simpler to add new functions to the open platform.

Embodiment 2

Figure 2:
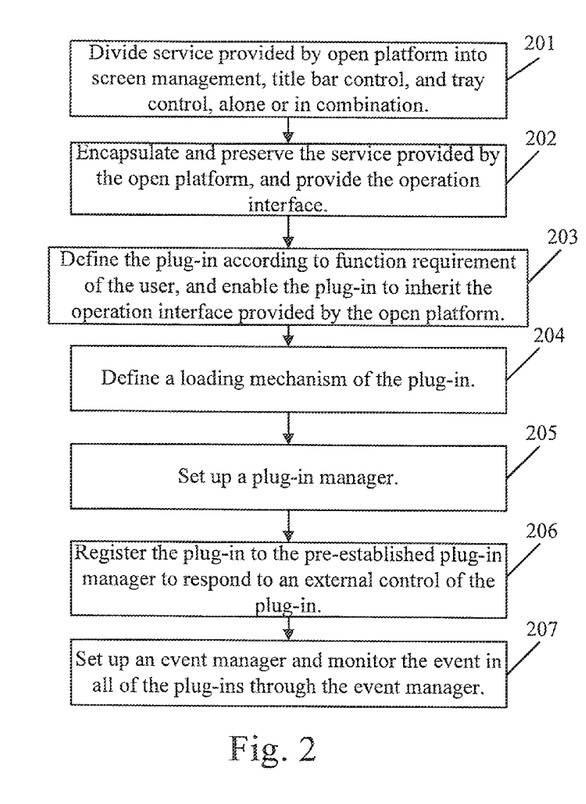
FIG. 2 is a flow chart of a method for implementing function extension of an open platform according to another embodiment of the present disclosure

FIG. 2 shows a method for implementing function extension of an open platform according to another embodiment of the present disclosure. This embodiment is an improvement of the previous embodiment. The expansion of the functions of a snap view is elaborated through the method provided by the present embodiment. The snap view is a management interface of the open platform. The desktop for the user can be switched between the desktop of the terminal operating system and the desktop of the open platform. Every function of the snap view is realized through the plug-in. The snap view can be well controlled by registering the plug-in to the plug-in manager. So, coupling among the functions is lowered. It is easier to maintain and test the functions. And the expansion of the functions is good.

It is notified that the snap view is an interface management program comprising the open platform comprising a function of screen management.

FIG. 2 shows a method for implementing function extension of the open platform. The method comprises following steps of:

Step 201: dividing the service provided by the open platform into screen management, title bar control, and tray control, alone or in combination.

It is notified that the function framework of the snap view is formed by screen management, title bar control, and tray control, alone or in combination.

The screen management is used for managing the screen. The screen management comprises at least functions of a screen background setting and/or a screen switching.

The title bar control comprises a browse bar control and/or a tool bar control and is used for display and layout control of the plug-in on the snap view.

The tray control is used for dealing with function reminding of the tray zone and/or the function menu of the right button.

Step 202: encapsulating and preserving the service provided by the open platform, and providing the operation interface.

Specifically, the service provided by the open platform described in Step 201 is encapsulated to form a corresponding category, such as the screen management is encapsulated as CSreenMgr, the title bar as CtitleBar, and the tray zone as CTray. Further, a service entry is provided in public. For example, the service entry is encapsulated as CDesktopFramework. A plurality of entry functions are provided under CDesktopFramework. The plug-in which inherits the operation interface of the open platform can transmit the control parameter input by the user to the entry parameter for obtaining corresponding functions provided by the control parameter.

After the service is encapsulated, the operation interface is provided in public. Concretely, the operation interface is an IQPlusAddin interface. Besides, any plug-in which is obtained from the subsequent development inherits the IQPlusAddin interface so that the developed plug-in can comprise the control function, such as enabling, terminating, etc.

It is notified that the encapsulated service does not allow a reverse call of the plug-in.

Step 203: Defining the plug-in according to function requirement of the user, and enabling the plug-in to inherit the operation interface provided by the open platform.

It is notified that each function is executed through a plug-in in the present disclosure. Further, each function inherits the operation interface provided by the function framework so that the interface of the open platform can be controlled in public.

Further, the developed plug-in needs to inherit the operation interface according to the user's need about the plug-in so that the control parameter can transmit the control parameter input by the user to the service entry provided by the open platform. The user can obtain the service provided by the open platform through the service entry.

Step 204: Defining a loading mechanism of the plug-in.

It is notified that the loading mechanism comprises a plurality of mechanisms, such as a local loading and/or a remote loading.

If the loading mechanism of the plug-in is the local loading, the open platform reads and executes the plug-in locally whenever being enabled.

If the loading mechanism of the plug-in is the remote loading, the open platform reads and executes the plug-in from a designated network location whenever being enabled.

Loose coupling between the plug-in and the function framework of the open platform is achieved through an indirect remote loading technology. It is unnecessary to save the plug-in locally at the beginning. Instead, the plug-in can be loaded from the Internet whenever being enabled. This technology greatly reduces the content of an installation package. Owing to the consistence of the interface inherited by the plug-in, the plug-in can be managed and controlled flexibly. The loose coupling means a lower coupling.

Step 205: Setting up a plug-in manager.

The plug-in manager is used for recording the plug-in of the open platform and for saving information on the location and allocation of the plug-in; the information on the allocation comprises the loading mechanism of the plug-in, etc.

Further, the plug-in manager further comprises the function of enabling and disabling the plug-in. The plug-in manager enables/disables the corresponding plug-in according to the information on the location of the plug-in upon the condition that plug-in manager receives the request of enabling/disabling the corresponding plug-in from the user.

Step 206: Registering the plug-in to the pre-established plug-in manager to respond to an external control of the plug-in.

The way for responding to the control of the plug-in is that, for example, the dynamic loading or termination is conducted in activation.

The pre-established plug-in manager where the plug-in is registered concretely comprises:

the plug-in manager recording the information on the location and allocation of the plug-in;

further, the plug-in transmitting the control parameter to the service entry upon the condition that the plug-in receives the control parameter input by the user after the plug-in is registered to the plug-in manager.

Step 207: Setting up an event manager and monitoring the event in all of the plug-ins through the event manager.

Further, the event manager monitors the event of the plug-in to complete the correspondance between the plug-ins. How the correspondance between the plug-ins is managed by the event manager is described as follows. Observer is an onset plug-in for monitoring a sensitive event. EventSource is an onset plug-in of a sensitive event. Specifically, Step A: Send a notification message of a monitoring sensitive event to the event manager, and monitor the monitoring sensitive event through the event manager.

Step B: Upon the condition that a sensitive event occurs to EventSource, send a notification message to the event manager.

Step C: The event manager sends the notification message to Observer.

A method for implementing function extension of the open platform is that the service provided by the open platform is encapsulated and the operation interface is provided in the present embodiment. The inherited operation interface used for unifying the plug-ins transmits the control parameter to the service entry through the interface to obtain the service. Thus, the framework of the open platform is simplified and the coupling of the open platform is lowered. Since the fundamentals of the open platform are ensured, the plug-in is managed uniformly by the plug-in manager. In this way, it becomes easier to manage and dynamically expand the open platform, and it gets simpler to add new functions to the open platform. Besides, the event manager monitors the event of the plug-in to complete the correspondance between the plug-ins so that the plug-ins have weak reliance with one another, which is good for management of the plug-ins.

Embodiment 3

Figure 3:
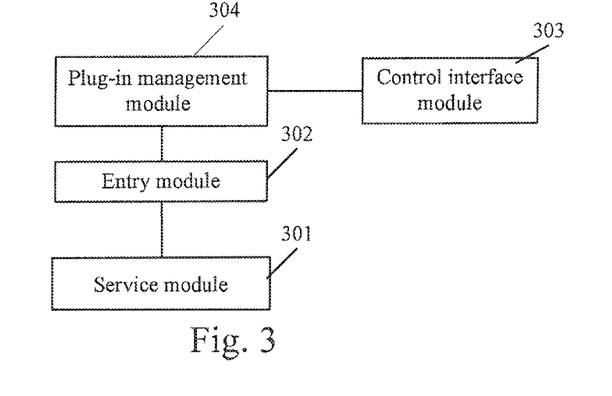
FIG. 3 shows block diagram of a system for implementing function extension of an open platform according to yet another embodiment of the present disclosure

FIG. 3 shows a system for implementing function extension of an open platform according to yet another embodiment of the present disclosure. The system comprises:

a control interface module 303, for defining a plug-in for the plug-in to transmit a control parameter input by a user to a service entry of the open platform;

a plug-in manager module 304, for registering the plug-in and recording information on locations of all registered plug-ins, and for enabling the plug-in according to the information on the corresponding location of the plug-in upon the condition that the plug-in manager module receives the request of enabling the corresponding plug-in from the user.

The control interface module 303 provides an operation interface to the plug-in so that the plug-in can access the entry module through the inherited operation interface.

The system further comprises:

a service module 301, for encapsulating and saving at least one of screen management, title bar control, and tray control, or the combination of any two of screen management, title bar control, and tray control, or the combination of the three; these services being provided by the open platform to the plug-in;

an entry module 302, for providing an entry to the services encapsulated and saved by the service module 301 to the plug-in so that the plug-in can transmit the control parameter input by the user to the service entry.

Figure 4:
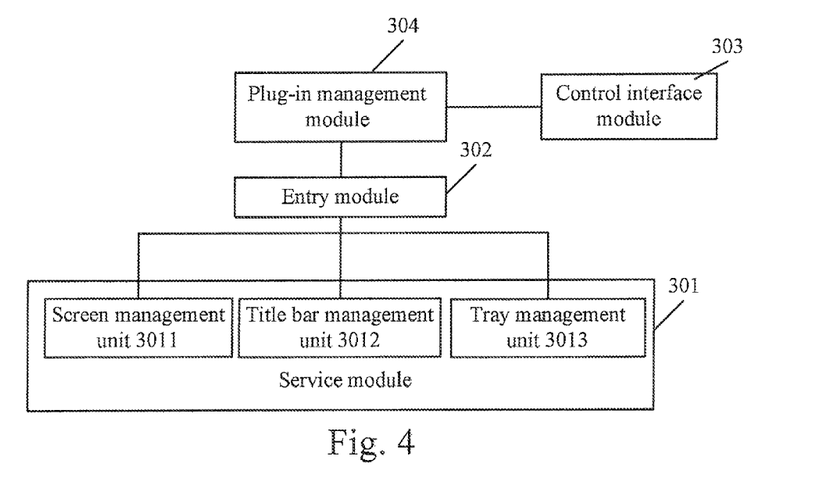
FIG. 4 shows a block diagram of the service module as shown in FIG. 3.

Further, as shown in FIG. 4, the service module 301 comprises:

a screen management unit 3011, used for encapsulating and saving the service of managing the screen provided by the open platform to the plug-in, and comprising at least the service of screen background installation and the service of screen switching;

a title bar management unit 3012, used for encapsulating and saving the service of controlling the browse bar and the tool bar provided by the open platform to the plug-in, and comprising services of display and layout of the plug-in on the interface of the open platform;

a tray management unit 3013, for encapsulating and saving services of function reminding of the tray zone and control of the function menu of the right button The tray control is used for providing function reminding of the tray zone and/or the function menu of the right button.

Figure 5:
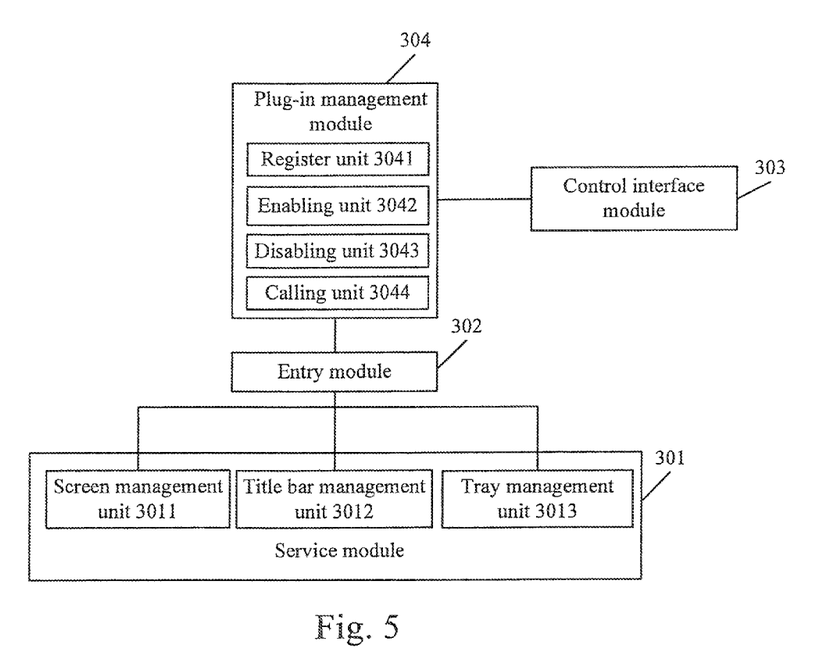
FIG. 5 shows a block diagram of the plug-in manager module as shown in FIG. 3.

Further, the plug-in manager module 304 as shown in FIG. 5 comprises:

a register unit 3041, for registering the plug-in and recording information on the location of the plug-in;

a calling unit 3044, for transmitting the control parameter to the entry module after the plug-in receives the control parameter sent by the user.

Furthermore, the plug-in management module 304 further comprises:

an enabling unit 3042, for enabling the plug-in according to the information on the location of the plug-in upon the condition that the enabling unit 3042 receives the request of enabling the plug-in from the user;

a disabling unit 3043, for disabling the plug-in upon the condition that the disabling unit 3043 receives the request of disabling the plug-in from the user.

Furthermore, the system further comprises:

an event manager module 305, for receiving an event notification message sent by the plug-in once all of the plug-ins trigger events so that the event manager can finish monitoring the events of all of the plug-ins.

Figure 6:
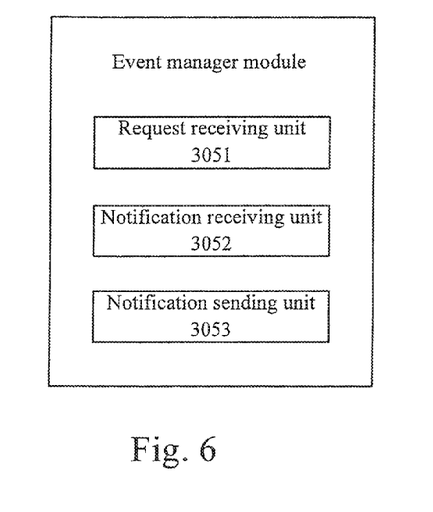
FIG. 6 shows a block diagram of the event manager module as shown in FIG. 3.

As shown in FIG. 6, the event manager module 305 comprises:

a request receiving unit 3051, for receiving a request of monitoring a predetermined event sent by a first plug-in;

a notification receiving unit 3052, for receiving a message notification sent by a second plug-in upon the condition that the second plug-in triggers the predetermined event;

a notification sending unit 3053, for sending a notification message because of the triggered predetermined event to the first plug-in which monitors the predetermined event to complete the communication between the first plug-in and the second plug-in.

It is notified that the service provided by the service module 301 does not allow a reverse call of the plug-in.

The control interface module is further used for defining the loading mechanism of the plug-in in the system of the present embodiment.

The loading mechanism of the plug-in comprises a local loading and a remote loading.

Upon the condition that the loading mechanism of the plug-in is the local loading, the plug-in manager module is further used for enabling the plug-in according to the corresponding location of the plug-in. Upon the condition that the plug-in manager module enables the plug-in, the plug-in manager module is further used for reading and executing the plug-in locally.

Upon the condition that the loading mechanism of the plug-in is the remote loading, the plug-in manager module further enables the plug-in according to the information on the location which the plug-in corresponds to. Upon the condition that the plug-in manager module enables the plug-in, the plug-in manager module further obtains and executes the plug-in from a designated network location.

A system for implementing function extension of the open platform is provided in the present embodiment. The developer can understand the functions of the plug-ins through the framework provided by the system. After understanding the functions of the plug-ins, the developer can transmit the control parameter to the service entry through the operation interface of the inherited open platform to obtain the service. Thus, the framework of the open platform is simplified and the coupling of the open platform is lowered. Since the fundamentals of the open platform are ensured, the plug-in is managed uniformly by the plug-in manager. In this way, it becomes easier to manage and dynamically expand the open platform, and it gets simpler to add new functions to the open platform. Besides, the event manager monitors the event of the plug-in to complete the correspondance between the plug-ins so that the plug-ins have weak reliance with one another, which is good for management of the plug-ins.

One having ordinary skill in the art can understand that the total steps or some of the steps of the above-mentioned embodiments can be completed through hardware. Or, the total steps or some of the steps of the above-mentioned embodiments can be completed by commanding relative hardware through programs. The program can be stored in a computer-readable storage medium such as read-only memory (ROM), a magnetic disk, and a compact disk.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for implementing function extension of an open platform, comprising:

defining a plug-in according to function requirements of a user, and enabling the plug-in to inherit an operation interface provided by a pre-established open platform so that the plug-in is capable of transmitting a control parameter input by the user to a service entry provided by the open platform for obtaining a service provided by the open platform through the service entry;

registering the plug-in to a pre-established plug-in manager;

wherein the plug-in manager records information on locations of all registered plug-ins, and the plug-in manager enables the plug-in according to the information on a location which the plug-in corresponds to upon the condition that the plug-in manager is commanded to enable the plug-in;

before the step of defining a plug-in according to function requirements of a user, the method further comprises:

defining the service provided by the open platform as a screen management, a title bar control, and a tray control, encapsulating the service provided by the open platform to form a corresponding category, and providing the service entry in public for the plug-in to obtain the service provided by the open platform through the service entry;

before the step of registering the plug-in to a pre-established plug-in manager, the method further comprises;

defining the loading mechanism of the plug-in;

the loading mechanism of the plug-in comprising a local loading and a remote loading.

2. The method as claimed in claim 1, wherein the screen management is used for managing a screen and comprises at least functions of a screen background setting and a screen switching;

the title bar control comprises a browse bar control and a tool bar control and is used for display and layout control of the plug-in on the interface of the open platform;

the tray control is used for providing function reminding of a tray zone and the function menu of the right button.

3. The method as claimed in claim 1, wherein upon the condition that the loading mechanism of the plug-in is the local loading, the plug-in manager enables the plug-in according to the information on the location which the plug-in corresponds to, and the method further comprises:

upon the condition that the plug-in manager enables the plug-in, the plug-in manager reading and executing the plug-in locally;

upon the condition that the loading mechanism of the plug-in is the remote loading, the plug-in manager enabling the plug-in according to the information on the location which the plug-in corresponds to, and the method further comprises:

upon the condition that the plug-in manager enables the plug-in, the plug-in manager obtaining and executing the plug-in from a designated network location.

4. The method as claimed in claim 1, wherein the method further comprises;

setting up an event manager, and arranging that all of the plug-ins of the open platform send event notification messages to the event manager when an event triggers so that the event manager finishes monitoring the event of all of the plug-ins of the open platform.

5. The method as claimed in claim 4, wherein the method further comprises:

receiving, by the event manager, a request of monitoring a predetermined event sent by a first plug-in;

receiving a message notification sent by a second plug-in upon the condition that the second plug-in triggers the predetermined event;

sending, by the event manager, a notification message because of the triggered predetermined event to the first plug-in to complete the communication between the first plug-in and the second plug-in.

6. A method for implementing function extension of an open platform, comprising:

defining a service provided by an open platform as a screen management, a title bar control, and a tray control, alone or in combination, encapsulating the service provided by the open platform to form a corresponding category, and providing a service entry in public for a plug-in to obtain the service provided by the open platform through the service entry;

defining the plug-in for transmitting a control parameter input by a user to the service entry provided by the open platform;

providing an operation interface to the plug-in;

registering the plug-in to a plug-in manager which is pre-established;

registering the plug-in and recording the information on the location of the plug-in;

transmitting the control parameter to an entry module after the plug-in receives the control parameter sent by the user;

wherein the plug-in manager records information on locations of all registered plug-ins, and the plug-in manager enables the plug-in according to the information on a location which the plug-in corresponds to upon the condition that the plug-in manager is commanded to enable the plug-in.

7. The method as claimed in claim 6, wherein the step of defining a plug-in comprises:

defining a plug-in according to function requirements of a user, and enabling the plug-in to inherit an operation interface provided by an open platform which is pre-established, and the plug-in is used for transmitting a control parameter input by the user to a service entry provided by the open platform for obtaining a service provided by the open platform through the service entry.

8. The method as claimed in claim 6, wherein the screen management is used for managing the screen and comprises at least functions of a screen background setting and/or a screen switching;

the title bar control comprises a browse bar control and/or a tool bar control and is used for display and layout control of the plug-in on the interface of the open platform;

the tray control is used for providing function reminding of the tray zone and/or the function menu of the right button.

9. The method as claimed in claim 6, wherein before the step of registering the plug-in to a plug-in manager which is pre-established, the method further comprises:

defining a loading mechanism of the plug-in;

the loading mechanism comprising a local loading and/or a remote loading.

10. The method as claimed in claim 9, wherein upon the condition that the loading mechanism of the plug-in is the local loading, the plug-in manager enables the plug-in according to the information on the location which the plug-in corresponds to, and the method further comprises:

upon the condition that the plug-in manager enables the plug-in, the plug-in manager reads and executes the plug-in locally.

11. The method as claimed in claim 9, wherein upon the condition that the loading mechanism of the plug-in is the remote loading, the plug-in manager enables the plug-in according to the information on the location which the plug-in corresponds to, and the method further comprises:

upon the condition that the plug-in manager enables the plug-in, the plug-in manager obtaining and executing the plug-in from a designated network location.

12. The method as claimed in claim 6, further comprising:

setting up an event manager, and arranging that all plug-ins of the open platform send event notification messages to the event manager when an event triggers so that the event manager finishes monitoring the event of all of the plug-ins of the open platform.

13. The method as claimed in claim 12, further comprising:

receiving, by the event manager, a request of monitoring a predetermined event sent by a first plug-in;

receiving a message notification sent by a second plug-in upon the condition that the second plug-in triggers the predetermined event;

sending, by the event manager, a notification message because of the triggered predetermined event to the first to complete the communication between the first plug-in and the second plug-in.

14. A system for implementing function extension of an open platform, comprising:

a processor;

a memory connected with the processor, the memory comprising a plurality of programs executable by the processor, the plurality of programs comprising:

a control interface module, configured to cause the processor to define a plug-in used for transmitting a control parameter input by a user to a service entry of the open platform;

a plug-in manager module, configured to cause the processor to register the plug-in and recording information on locations of all registered plug-ins, and configured to enable the plug-in according to the information on a location which the plug-in corresponds to when receiving a request of enabling the plug-in, the plug-in manager module comprising:

a register unit, configured to cause the processor to register the plug-in and record the information on the location of the plug-in;

a calling unit, configured to cause the processor to transmit the control parameter to the entry module after the plug-in receives the control parameter sent by the user;

a service module, configured to cause the processor to encapsulate and saving services provided by the open platform to the plug-in, the services comprising screen management, title bar control, and tray control, alone or in combination;

an entry module, configured to cause the processor to provide an entry to the services encapsulated and saved by the service module to the plug-in so that the plug-in is used for transmitting the control parameter input by the user to the service entry.

15. The system as claimed in claim 14, wherein the controlling interface module is configured to cause the processor to define the plug-in according to function requirement of a user, and to enable the plug-in to inherit an operation interface provided by an open platform which is pre-established, and the plug-in is used for transmitting a control parameter input by the user to a service entry provided by the open platform for obtaining a service provided by the open platform through the service entry.

16. The system as claimed in claim 14, wherein the service module comprises:

a screen management unit, configured to cause the processor to encapsulate and to save the service of managing the screen provided by the open platform to the plug-in, and comprising at least the service of screen background installation and the service of screen switching;

a title bar management unit, configured to cause the processor to encapsulate and to save the service of controlling the browse bar and the tool bar provided by the open platform to the plug-in, and comprising services of display and layout of the plug-in on the interface of the open platform; and a tray management unit, configured to cause the processor to encapsulate and save services of function reminding of the tray zone and control of the function menu of the right button, the tray control used for providing function reminding of a tray zone and/or a function menu of a right button.

17. The system as claimed in claim 14, wherein the controlling interface module is configured to cause the processor to define a loading mechanism of the plug-in;

the loading mechanism of the plug-in comprising a local loading and a remote loading.

18. The system as claimed in claim 17, wherein upon the condition that the loading mechanism of the plug-in is the local loading, the plug-in manager module is configured to cause the processor to enable the plug-in according to the corresponding location of the plug-in, and upon the condition that the plug-in manager module enables the plug-in, the plug-in manager module is further used for reading and executing the plug-in locally.

19. The system as claimed in claim 17, wherein upon the condition that the loading mechanism of the plug-in is the remote loading, the plug-in manager module is configured to cause the processor to enable the plug-in according to the information on the location which the plug-in corresponds to, and upon the condition that the plug-in manager module enables the plug-in, the plug-in manager module is configured to cause the processor to obtain and execute the plug-in from a designated network location.

20. The system as claimed in claim 14, wherein the plug-in manager module comprises:

a register unit, configured to cause the processor to register the plug-in and recording information on the location of the plug-in;

an enabling unit, configured to cause the processor to enable the plug-in according to the information on the location of the plug-in upon the condition that the enabling unit receives the request of enabling the plug-in from the user;

a disabling unit, configured to cause the processor to disable the plug-in upon the condition that the disabling unit receives the request of disabling the plug-in from the user; and a calling unit, configured to cause the processor to transmit the control parameter to the entry module after the plug-in receives the control parameter sent by the user.

21. The system as claimed in claim 14, further comprising:

an event manager module, configured to cause the processor to receive an event notification message sent by the plug-in once all of the plug-ins trigger events so that the event manager can finish monitoring the events of all of the plug-ins.

22. The system as claimed in claim 21, wherein the event manager module comprises:

a request receiving unit, configured to cause the processor to receive a request of monitoring a predetermined event sent by a first plug-in;

a notification receiving unit, configured to cause the processor to receive a message notification sent by a second plug-in upon the condition that the second plug-in triggers the predetermined event;

a notification sending unit, configured to cause the processor to send a notification message because of the triggered predetermined event to the first plug-in which monitors the predetermined event to complete the communication between the first plug-in and the second plug-in.

* * * * *